(12) United States Patent
Biles

(10) Patent No.: US 7,269,759 B2
(45) Date of Patent: Sep. 11, 2007

(54) DATA PROCESSING APPARATUS AND METHOD FOR HANDLING CORRUPTED DATA VALUES

(75) Inventor: Stuart David Biles, Balsham (GB)

(73) Assignee: ARM Limited, Cambridge (GB)

( * ) Notice: Subject to any disclaimer, the term of this patent is extended or adjusted under 35 U.S.C. 154(b) by 487 days.

(21) Appl. No.: 10/912,103

(22) Filed: Aug. 6, 2004

(65) Prior Publication Data

US 2005/0071722 A1    Mar. 31, 2005

(30) Foreign Application Priority Data

Sep. 26, 2003  (GB) ................................. 0322635.4

(51) Int. Cl.
*G11C 29/52*    (2006.01)
(52) U.S. Cl. ........................... 714/42; 714/54; 714/763
(58) Field of Classification Search ................ 714/42, 714/54, 763; *G11C 29/52*
See application file for complete search history.

(56) References Cited

U.S. PATENT DOCUMENTS

| 4,456,996 | A |   | 6/1984  | Haas et al. |       |
|-----------|---|---|---------|-------------|-------|
| 4,625,273 | A |   | 11/1986 | Woffinden et al. |  |
| 6,272,651 | B1 |  | 8/2001  | Chin et al. |       |
| 6,594,785 | B1 | * | 7/2003 | Gilbertson et al. | 714/48 |
| 6,968,427 | B1 | * | 11/2005 | Yee | 714/42 |

(Continued)

FOREIGN PATENT DOCUMENTS

JP           56-145434        11/1981

OTHER PUBLICATIONS

Somani et al.; A cache error propagation model; Fault-Tolerant Systems, 1997. Proceedings., Pacific Rim International Symposium on; Dec. 15-16, 1997; pp. 15-21.*

Baumann, R.; Soft errors in advanced computer systems; IEEE Design & Test of Computers; vol. 22 Issue: 3 May-Jun. 2005; pp. 258-266.*

(Continued)

*Primary Examiner*—R. Stephen Dildine
(74) *Attorney, Agent, or Firm*—Nixon & Vanderhye P.C.

(57) ABSTRACT

The present invention provides a data processing apparatus and method for handling corrupted data values. The method comprises the steps of: a) accessing a data value in a memory within a data processing apparatus; b) initiating processing of the data value within the data processing apparatus; c) whilst at least one of the steps a) and b) are being performed, determining whether the data value accessed is corrupted; and d) when it is determined that the data value is corrupted, disabling an interface used to propagate data values between the data processing apparatus and a device coupled to the data processing apparatus to prevent propagation of a corrupted data value to the device. When a data value is accessed, the data processing apparatus can begin processing of that data value and, hence, the performance of the data processing apparatus is not reduced. If it is determined that the data value which was accessed was corrupted or contains an error then the interface which couples the data processing apparatus with the device is disabled. Disabling the interface effectively quarantines any corrupted data values by preventing them from being propagated to the device. Preventing corrupted data values from being propagated to the device ensures that no change in state can occur in the device as a result of the corrupted data values.

26 Claims, 9 Drawing Sheets

U.S. PATENT DOCUMENTS

2004/0049713 A1* 3/2004 Zhang ........................ 714/42
2004/0153735 A1* 8/2004 Rust et al. .................... 714/6
2004/0216026 A1* 10/2004 Ferraiolo et al. ........... 714/758
2005/0091383 A1* 4/2005 Bender et al. .............. 709/228

OTHER PUBLICATIONS

Sridharan et al.; Reducing Data Cache Susceptibility to Soft Errors; Dependable and Secure Computing, IEEE Transactions on; vol. 3 Issue: 4 Oct.-Dec. 2006; pp. 353-364.*

* cited by examiner

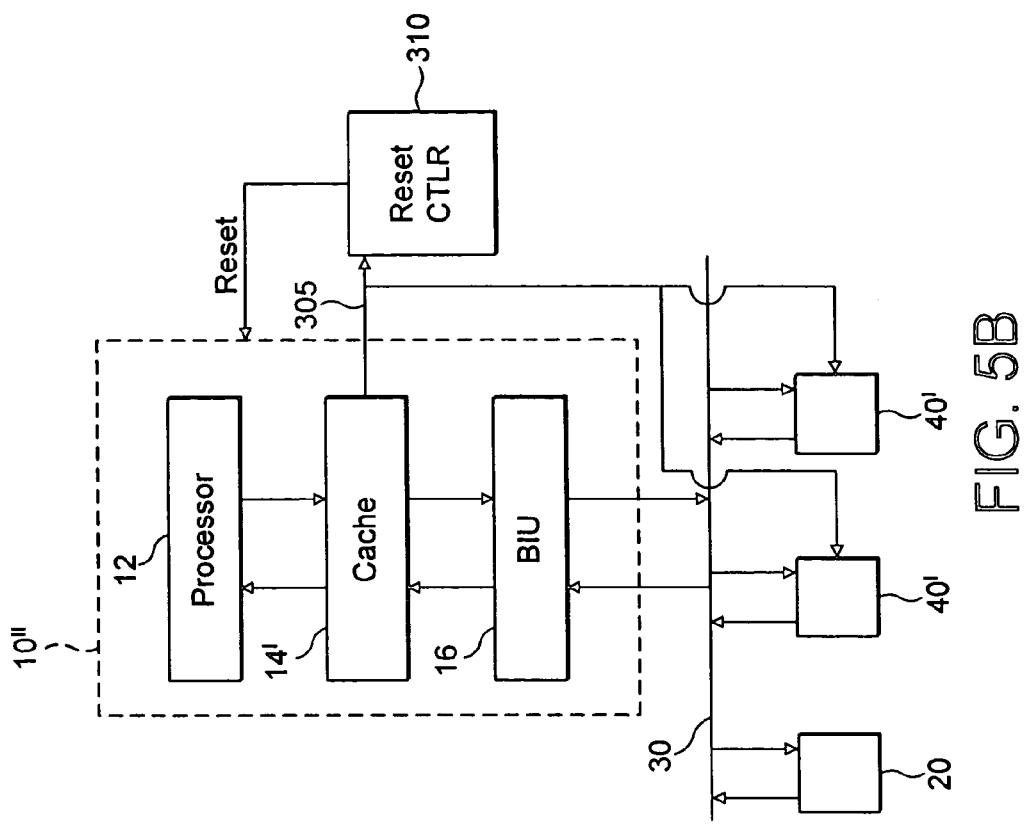
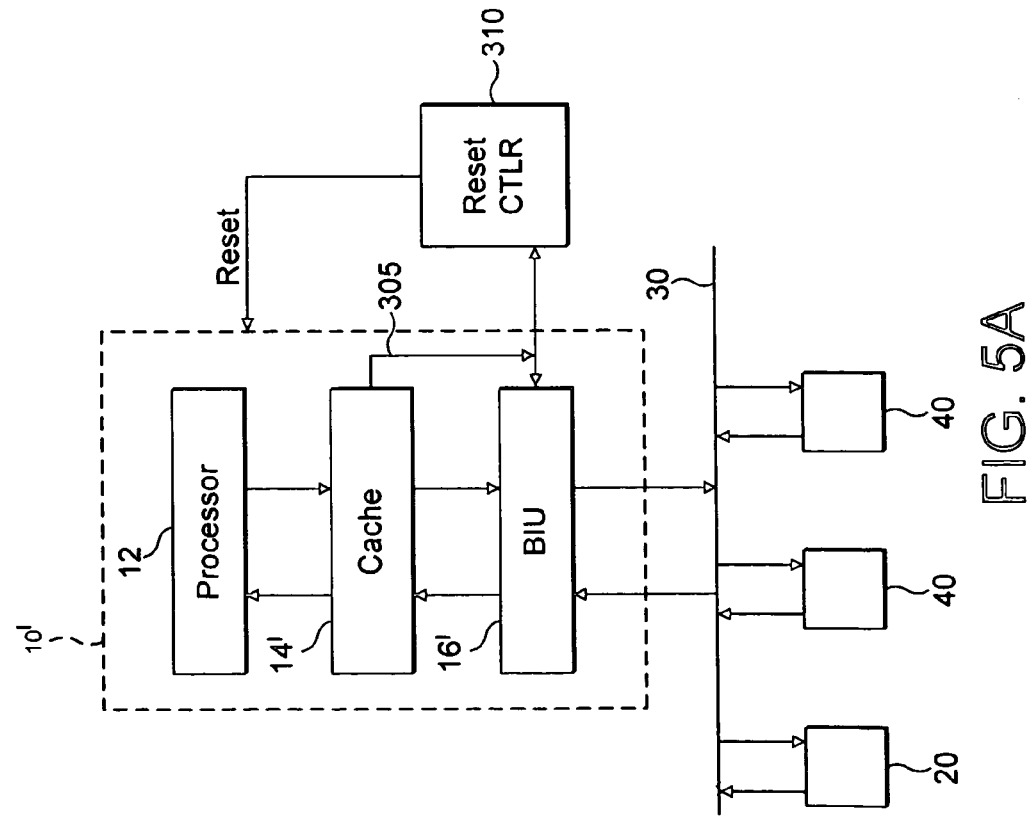

US 7,269,759 B2

DATA PROCESSING APPARATUS AND METHOD FOR HANDLING CORRUPTED DATA VALUES

BACKGROUND OF THE INVENTION

1. Field of the Invention

The present invention relates to a data processing apparatus and method for handling corrupted data values.

2. Description of the Prior Art

In a known data processing apparatus, generally 1, as illustrated in FIG. 1A, there is provided a processor core 10 arranged to process instructions received from a memory 20 via a bus 30. Data required by the processor core 10 for processing those instructions may also be retrieved from the memory 20 via the bus 30. A peripheral device may also be coupled to the bus 30.

The processor core 10 is illustrated in more detail in FIG. 2A, with more detail of the interfaces being illustrated in FIG. 2B. Typically, the processor core 10 comprises a processor 12, a cache 14 and a bus interface unit (BIU) 16. The cache 14 is provided for storing data values (which may be data and/or instructions) retrieved from the memory 20 so that they are subsequently readily accessible by the processor 12. The cache 14 will store the data value associated with a memory address until it is overwritten by a data value for a new memory address required by the processor 12. The data value is stored in cache 14 using either physical or virtual memory addresses. Should the data value in the cache 14 have been altered then it is usual to ensure that the altered data value is re-written to the memory 20, either at the time the data is altered or when the data value in the cache 14 is overwritten.

The BIU 16 is used to retrieve and store data values between the cache 14, the memory 20 and the peripheral device 40. For example, should there be a cache miss when accessing the cache 14, the BIU 16 will initiate a read from the memory 20. The memory 20 then outputs the data value at the address specified. The BIU 16 will then pass the data value to the cache 14, where it can be stored and also read by the processor 12. Subsequently, that data value can readily be accessed directly from the cache 14 by the processor 12. Between the processor 12 and cache 14 are provided an address bus (CACHE_ADD) over which the address associated with a data value is passed, read data bus (CACHE_Rdata) over which data values read from the cache 14 are passed, write data bus (CACHE_Wdata) over which data values to be stored in the cache 14 are passed and a command bus (CACHE_CMD) over which instructions are provided to the cache 14. Between the cache 14 and the BIU 16 are provided an address bus (BIU_ADD) over which the address associated with a data value is passed, read data bus (BIU_Rdata) over which data values read from the BIU 16 are passed, write data bus (BIU_Wdata) over which data values read from the cache 14 are passed and an command bus (BIU_CMD) over which the operation to be performed by the BIU is provided.

The memory 20 and the cache 14 typically store each element or bit of a data value in a memory cell. An example configuration of a so-called "static" memory cell, which is typically employed with the cache 14, is illustrated in FIG. 1B. It will be appreciated that the arrangement shown in FIG. 1B is generic and that the detailed implementation of such static memory may vary slightly. Each memory cell typically includes two inverters 300, 310 and a tristate gate 320. To write a data value into the cell, a WRITE_ENABLE signal is asserted on the trisate gate 320 which drives the inverse of the value of the WRITE_DATA signal onto the node 330. The weak feedback provided by the inverter 310 forms a positive feedback loop to hold the value on the node 330 constant, thereby storing the value of the WRITE_DATA signal in the cell. The weak feedback provided by the inverter 310 is weak enough to be overridden by the tristate gate 320 when writing a data value. The value of the WRITE_ENABLE signal can then be read by sensing the value of the READ_DATA signal.

A problem exists in that external environmental factors can affect the feedback provided by the inverter 310, which may cause the value stored on the node 330 to change state. Such external factors include the instance of a gamma ray on, for example, an active part of the inverter 310. Also, electromagnetic radiation in proximity to the memory device can result in a change in state. Similarly, fluctuations in the voltage supplied to the memory device can cause a change in state. In each of these illustrative situations, an external influence can lead to a corruption in the data values stored in the memory. Such corruption in a data value is often referred to as a "soft error". It will be appreciated that whilst the occurrence of such soft errors can be statistically low, increasing the density of a memory results in an increased likelihood that a soft error will occur.

To address the problem of soft errors, error detection and correction techniques are known. One such error detection technique is a parity check, whilst error correction coding is an example of an error correction technique. In the parity check technique, the number of bits in a data value set to, for example, '1' is calculated and, if the result is an odd number, then a parity bit appended to the data value is set to, for example, '1'; conversely, if the result is an even number, then the parity bit appended to the data value is cleared to, for example, '0'. By using this technique it is possible to detect with increased confidence whether or not a data value has been corrupted.

It will be appreciated that whilst the parity check technique increases the likelihood of detecting a corruption, a predetermined period is required to perform the parity check. Error correction coding typically takes even more time to perform than the parity check. In typical data processing apparatus, memory accesses become a critical path within the processor, ultimately limiting the speed at which the processor can be run. Hence, any increase in the time taken to access a data value, such as to perform a parity check, can result in the speed at which the processor can be run being reduced.

In view of the above, because the cache 12 is typically of a relatively low density when compared with memory 20, the likelihood of a soft error occurring is also lower. Hence, traditional caches 12 did not employ such a parity check technique. This is because it is undesirable to adversely affect the normal performance of the cache 12 in order to deal with a statistically infrequent event. In contrast, however, the memory 20 is typically of a relatively high density and so the likelihood of a soft error occurring is increased. Hence, it is known to employ a parity check in the memory 20. Implementing the parity check is possible because the speed at which the data values are accessed in the memory 20 is typically relatively slow in comparison to accesses to the cache 12. Accordingly, although the access time to the memory 20 is increased, there is typically little or no overall performance reduction between a memory 20 which employs parity check and one which does not.

In certain applications, such as in so-called "embedded systems", the processor core 10 provides data values to the peripheral device 40 and that peripheral device 40 is a so-called safety-critical or fault-intolerant device such as an airbag controller, a brake system controller or the like. The operation of safety-critical devices needs to be well understood and predictable in order to gain the appropriate certification for the use of that device. Because the operation of the peripheral device 40 is dependent upon the data values provided by the processor core 10, when the peripheral device 40 is a safety-critical device, an increased assurance is required that no persistent change in the state of the peripheral device 40 can occur based on corrupted data values. Such changes in the state of the peripheral device 40 could result in, for example, the inappropriate activation of an air bag actuator or a brake servo, or the erroneous transmission of confidential information, such as information relating to a credit card transaction.

With each generation of processor core 10, the density of the cache 12 typically increases. Hence, a problem exists in that the likelihood of a soft error occurring in the cache 12 also increases. If the processor core 10 is to provide data values to a safety-critical device, then assurance is required that no persistent change in the state of the device can occur based on corrupted data values caused by, for example, a soft error. However, as mentioned above, accesses to the cache 12 are a critical path in the performance of the processor core 10. Accordingly, any increase in the time taken to access a data value from the cache 12 will adversely reduce the performance of the processor core 10. Hence, whilst a parity check could be performed in the cache 12, as increasingly occurs the L1 cache of a desktop processor system, because the likelihood of a soft error occurring is still relatively low in comparison to the likelihood of an error not occurring, it is undesirable to affect the overall performance of the processor core 10 to deal with such infrequently-occurring events.

Accordingly, it is desired to provide an improved technique for handling corrupted data values which can retain the performance of the processor core during normal operation whilst ensuring that corrupted data values do not cause a change in the state of a peripheral device.

SUMMARY OF THE INVENTION

Viewed from a first aspect, the present invention provides a method of handling corrupted data values, the method comprising the steps of: a) accessing a data value in a memory within a data processing apparatus; b) initiating processing of the data value within the data processing apparatus; c) whilst at least one of the steps a) and b) are being performed, determining whether the data value accessed is corrupted; and d) when it is determined that the data value is corrupted, disabling an interface used to propagate data values between the data processing apparatus and a device coupled to the data processing apparatus to prevent propagation of a corrupted data value to the device.

When the data value is accessed, the data processing apparatus can begin processing of that data value and, hence, the performance of the data processing apparatus is not reduced. It will be appreciated that the processing of the data value includes using that data value for a subsequent instruction and may or may not result in further data values being generated. If it is determined that the data value accessed was corrupted or contains an error then the interface which couples the data processing apparatus with the device is disabled. Disabling the interface effectively quarantines any corrupted data values (whether they be the originally accessed data values or any resultant data values) by preventing them from being propagated to the device. Preventing corrupted data values from being propagated to the device ensures that no change in state can occur in the device as a result of the corrupted data values.

Because processing of the data value accessed can start without waiting for any determination to be made as to whether the data value is corrupt or not, the data processing apparatus can conduct its normal processing operations, unaffected by the need to determine firstly whether the data value is corrupt. Hence, when processing data values, whether corrupt or not, the overall performance of the data processing apparatus is advantageously not reduced. This is because the determination of whether the data value is corrupt or not has been removed from the critical path. Instead, the determination can be made in parallel with the access and/or processing of the data value. According, the time taken to access a data value remains unchanged, irrespective of the time taken to determine whether the data value is corrupt.

By disabling the interface, the operation of the data processing apparatus can remain unaffected, whilst still preventing corrupted data values being propagated to the device. Disabling the interface provides the additional advantage of extending the time frame by which the determination of a corrupted data value needs to be made, whilst still preventing corrupted data values from being propagated to the device. It will be appreciated that the time frame available to disable the interface is any time prior to the corrupted data value being made available for transmission over the interface.

In an embodiment, step d) comprises the step of preventing the corrupted data value from being transmitted to the device coupled to the data processing apparatus.

Preventing the transmission of the corrupted data value from the data processing apparatus is a convenient way to isolate the data processing apparatus from the device in order to quarantine the data values.

In an embodiment, the data processing apparatus comprises an interface unit operable to transmit data values between the data processing apparatus and the device, and step d) comprises the step of inhibiting the operation of the interface unit to prevent the corrupted data value being transmitted to the device.

Hence, the corrupted data value may be prevented from being transmitted to the device by simply disabling the interface unit.

In an alternative embodiment, or in addition, step d) comprises the step of preventing the device coupled to the data processing apparatus from receiving the corrupted data value.

Preventing the corrupted data value from being received by the device is another convenient way to isolate the data processing apparatus from the device in order to quarantine the data values.

In an embodiment, the device comprises interface logic operable to receive data values from the data processing apparatus, and step d) comprises the step of inhibiting the operation of the interface logic to prevent the corrupted data value being received by the device.

Hence, the corrupted data value may be prevented from being received from the data processing apparatus by simply disabling the interface logic.

In an embodiment, the corrupted data value comprises the accessed data value.

Hence, the corrupted data value prevented from being propagated to the device may be the accessed data value itself which was determined to be corrupt.

In addition, or alternatively, step b) comprises initiating processing of the data value within the data processing apparatus in order to generate at least one resultant data value, and the corrupted data value may comprise the at least one resultant data value.

Hence, the corrupted data value prevented from being propagated to the device may be a data value which was generated using the accessed data value. It will be appreciated that any data value which was generated using a corrupted data value is also likely to be corrupted.

In an embodiment, step a) comprises the step of accessing the data value in the memory in a first processor cycle, and step b) comprises the step of initiating processing of the data value in a processor cycle subsequent to the first processor cycle.

In an embodiment, the completion of the determination in step c) takes place in a processor cycle subsequent to the first processor cycle.

It will be appreciated that steps b) and c) may occur in the same or different processor cycles, subsequent to the first processor cycle.

An embodiment further comprises the step of: e) reinitialising the data processing apparatus following a determination at step c) that the data value accessed is corrupted.

Hence, when a corrupted data value has been detected, the data processing apparatus may be subsequently reset. Because the interface has been disabled, resetting the data processing apparatus can be performed safely without risking propagating any corrupted data values or causing corruption to any data values which may have been propagated to the device.

An embodiment further comprises the step of: f) enabling the interface following reinitialisation of the data processing apparatus.

Following the re-initialisation of the data processing apparatus, the interface can safely be re-enabled in the absence of any further known corrupted data values.

The device and the data processing apparatus may be coupled by any appropriate connection medium. However, in one embodiment, the device is coupled to the data processing apparatus via a bus.

In an embodiment, the device is a safety-critical device, since in such embodiments, the isolation of corrupted data values from the safety-critical device provides significant benefits.

According to another aspect of the present invention, there is provided a data processing apparatus for handling corrupted data values, comprising: a memory from which a data value can be accessed; a processor operable to initiate processing of the data value; corruption logic operable, whilst at least one of the data value being accessed and the data value being processed is occurring, to determine whether the data value accessed is corrupted and, when it is determined that the data value is corrupted, to generate a corruption signal to disable an interface used to propagate data values between the data processing apparatus and a device coupled to the data processing apparatus to prevent propagation of a corrupted data value to the device.

BRIEF DESCRIPTION OF THE DRAWINGS

The present invention will be described further, by way of example only, with reference to a preferred embodiment thereof as illustrated in the accompanying drawings, in which:

FIG. 5A illustrates a data processing apparatus according to an embodiment of the present invention;

FIG. 5B illustrates a data processing apparatus according to another embodiment of the present invention;

DESCRIPTION OF PREFERRED EMBODIMENT

Figure 1A:
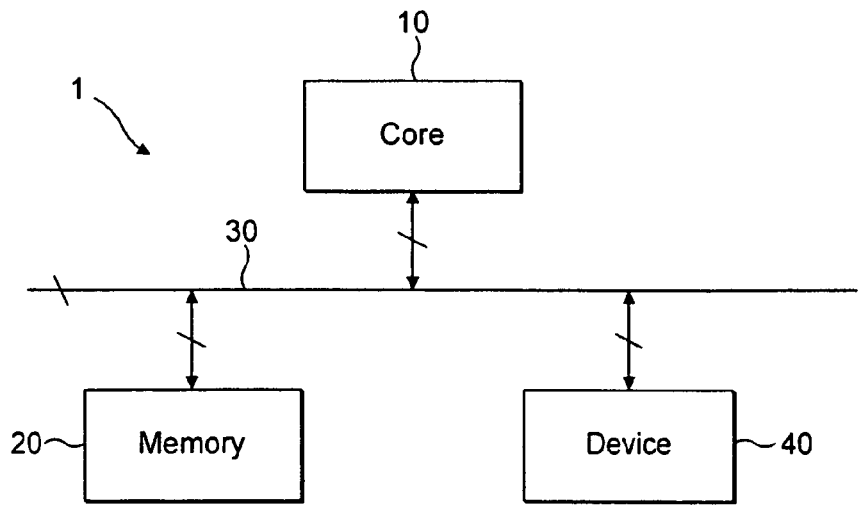
FIG. 1A illustrates a data processing apparatus.
Figure 1B:
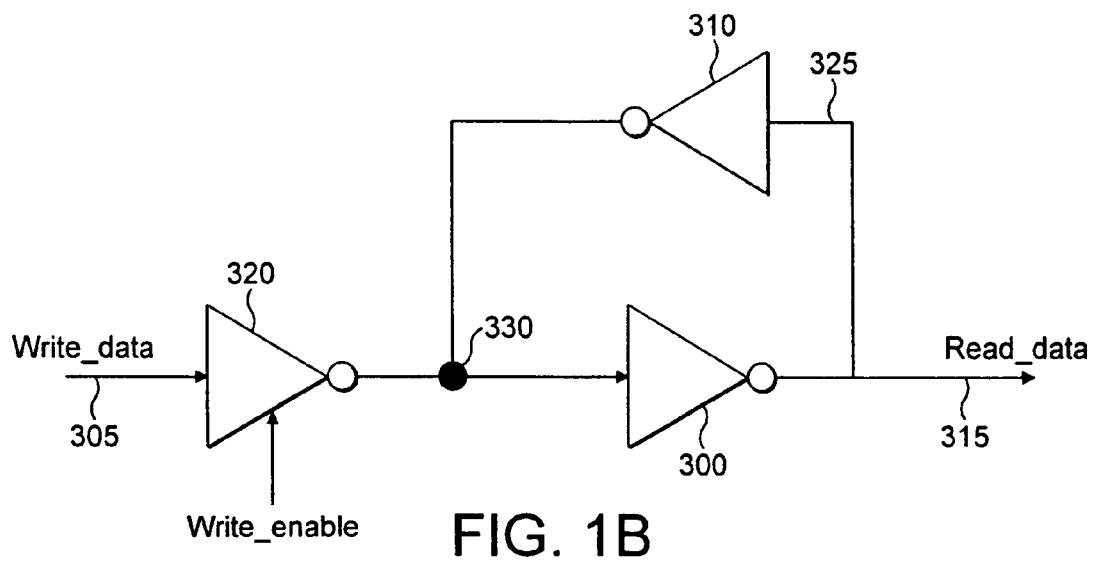
FIG. 1B illustrates the arrangement of an example static memory cell.
Figure 2A:
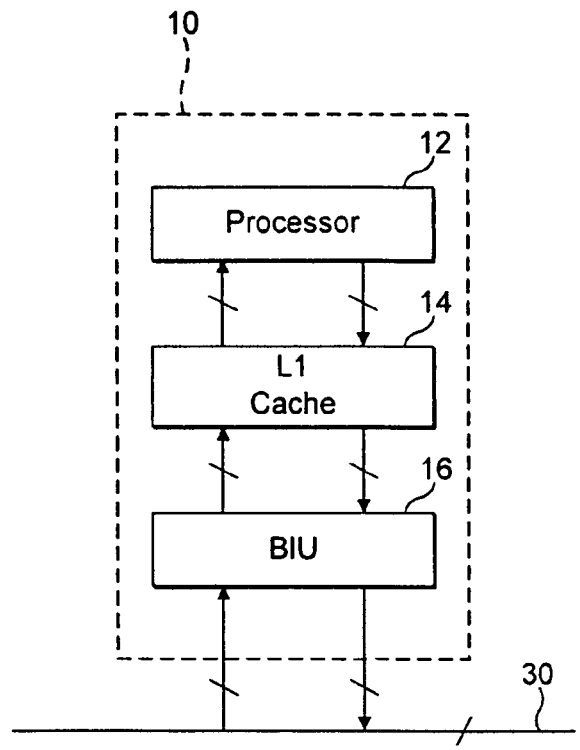
FIGS. 2A and 2B illustrates the processor core and interfaces of FIG. 1 in more detail.
Figure 2B:
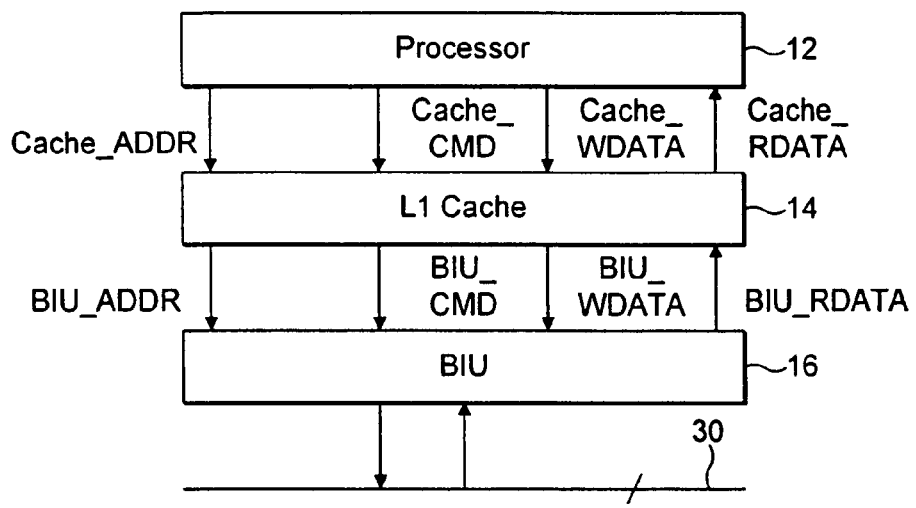
Figure 3:
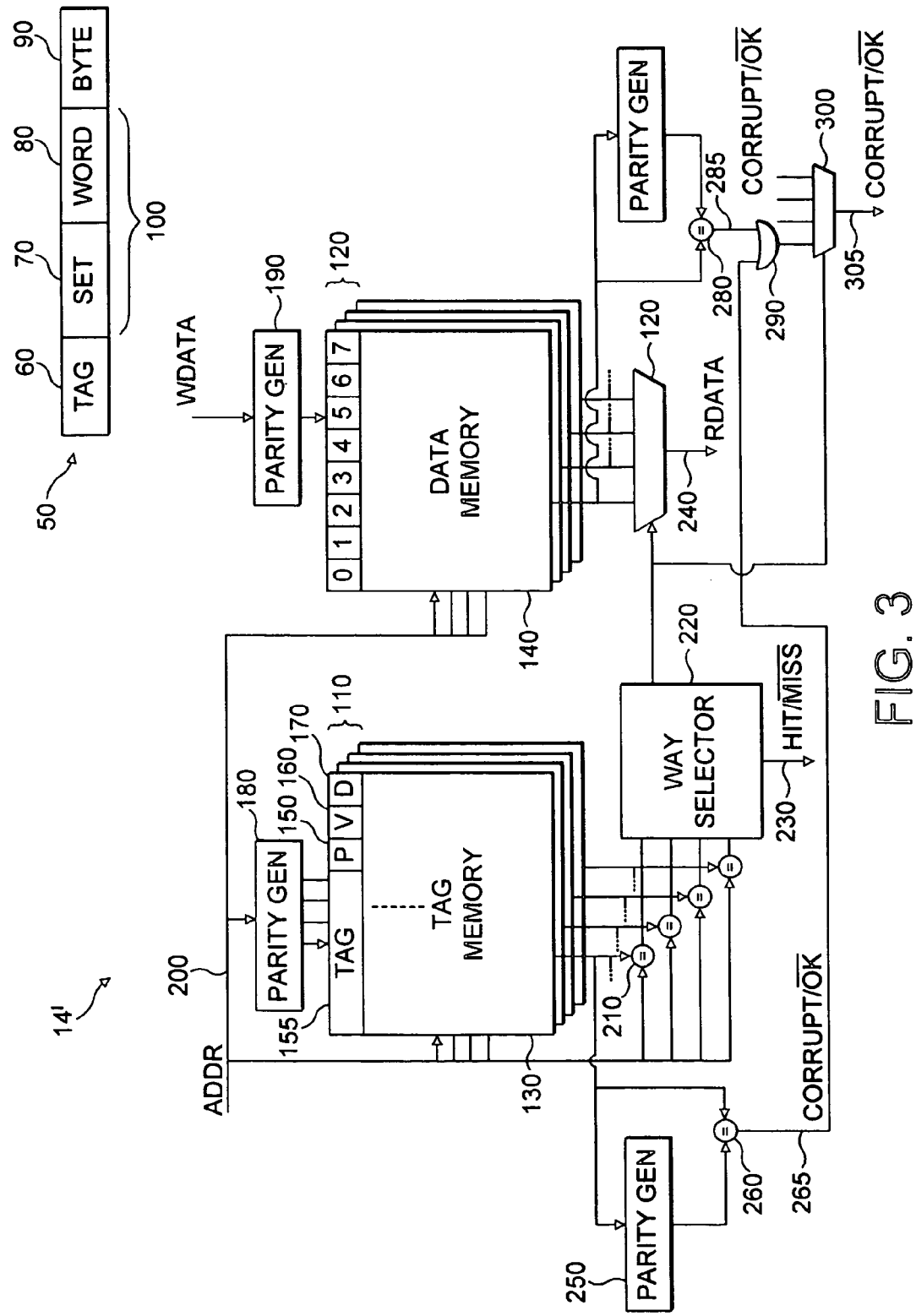
FIG. 3 illustrates a cache according to an embodiment of the present invention.

FIG. 3 illustrates a cache 14' according to an embodiment of the present invention. The cache 14' is a 4-way set associative cache which incorporates parity bit checking. Whilst 4 cache ways are illustrated, it will be appreciated that any number of cache ways could be used. Each of the 4 cache ways contain a number of cache lines. A data value (for example, a word) associated with a particular address can be stored in a particular cache line of any of the 4 cache ways (i.e. each set has 4 cache lines). If the cache 14' is a 16 Kbyte cache then each cache way stores 4 Kbytes (16 Kbyte cache/4 cache ways). If each cache line stores eight 32-bit words then there are 32 bytes/cache line (8 words×4 bytes/word) and 128 cache lines in each cache way ((4 Kbytes/cache way)/(32 bytes/cache line)). Hence, the total number of sets would be equal to 128.

The contents of a memory address 50 associated with each data value is also illustrated in FIG. 3. The memory address 50 consists of a TAG portion 60, and SET, WORD and BYTE portions 70, 80 and 90, respectively. The SET portion 70 of the memory address 50 is used to identify a particular set within the cache 14'. The WORD portion 80 identifies a particular word within the cache lines, identified by the SET portion 70, that is the subject of the access by the processor 12. The BYTE portion 90 allows a particular byte within the word to be specified, if required.

A word stored in the cache 14' may be read by specifying the memory address 50 of the word and by selecting the cache way which stores the word (the TAG portion 60 is used to determine in which cache way the word is stored, as will be described below). A logical address 100 (consisting of the SET portion 70 and WORD portion 80) then specifies the logical address of the word within that cache way.

A word stored in the cache 14' may be overwritten to allow a new word for an address requested by the processor 12 to be stored. Typically, when storing words in the cache 14', a so-called "linefill" technique is used whereby a complete cache line of, for example, 8 words (32 bytes) will be fetched and stored.

Each entry 110 in a TAG memory 130 is associated with a corresponding cache line 120 in a data memory 140, each cache line contains a plurality of data values, in this example, 8 data words. In addition to the TAG portion 60 stored in a. TAG section 155 for each entry 110, a number of status bits are provided within the TAG memory 130. These status bits are a valid bit 160, a dirty bit 170 and a parity bit 150.

The valid bit 160 is used to indicate whether a data value stored in the corresponding cache line is still considered valid or not. Hence, setting the valid bit 160 will indicate that the corresponding data values are valid, whilst clearing the valid bit 160 will indicate that at least one of the data values is no longer valid.

The dirty bit 170 is used to indicate whether any of the data values stored in the corresponding cache line are more up-to-date than the data value stored in the memory 20. The value of the dirty bit 170 is relevant for write back regions of memory, where a data value output by the processor core and stored in the cache 14' is not immediately also passed to the memory 20 for storage, but rather the decision as to whether that data value should be passed to memory 20 is taken at the time that the particular cache line is overwritten, or "evicted", from the cache 14'. Accordingly, a dirty bit 170 which is not set will indicate that the data values stored in the corresponding cache line correspond to the data values stored in memory 20, whilst a dirty bit 170 being set will indicate that at least one of the data values stored in the corresponding cache line has been updated, and the updated data value has not yet been passed to the memory 20.

When the data values in a cache line are overwritten in the cache 14', they will be output to memory 20 for storage if the valid and dirty bits 160, 170 indicate that the data values are both valid and dirty. If the data values are not valid, or are not dirty, then the data values can be overwritten without the requirement to pass the data values back to memory 20.

The parity bit 150 is used when retrieving data values from the cache 14' to determine whether an error has occurred during storage. The parity bit 150 is generated when storing data values in the cache 14'. The parity bit 150 is generated for the TAG section 155 of each entry 110 in the cache 14'. A parity bit is also generated for the data values stored in the corresponding cache line 120 and is appended thereto. In this example, the cache 14' is operable to access 64-bits each cycle. Accordingly, a parity bit is generated and appended to each 64-bit data value. However, it will be appreciated that the parity bit could be generated and appended to each data word or whatever the normal amount of data accessed from the cache 14' in one cycle may be. If the number of bits in the TAG section 155 set to a logical '1' is an odd number then the parity bit 160 generated by parity generation logic 180 is a '1'. If the number of bits in the TAG section 155 set to a logical '1' is an even number then the parity bit 160 generated by the parity generation logic 180 is cleared to a '0'. Similarly, if the number of bits in the data values stored in the 64-bit data value set to a logical '1' is an odd number, then the parity bit generated by parity generation logic 190 is a '1'. If the number of bits in the 64-bit data value set to a logical '1' is an even number, then the parity bit generated by the parity generation logic 190 is a '0'. The general structure of logic suitable for generating a parity bit will be described below with reference to FIG. 6. The use of the parity bits when accessing data values will be explained in more detail below.

When a write operation is issued by the processor 12, the memory address 50 of the data value to be written is placed on a processor address bus 200. The memory address 50 is received by the cache 14' from the processor address bus 200 and the TAG memory 130 in each cache way receives the memory address 50. A cache controller (not shown) determines, based on predetermined cache allocation policies, in which way the data value is to be written. The TAG memory 130 of the selected way is enabled and a TAG entry is selected based upon the SET portion 70 of the memory address 50. The TAG portion 60 is provided to a parity bit generator 180 which generates a parity bit based on the value of that TAG portion 60. The TAG portion 60 and the parity bit generated by the parity bit generator 180 are stored in the TAG entry. Whilst the parity bit generator 180 is shown within the cache 14', it will be appreciated that the parity bit generation could occur earlier in the cache access and, hence, the parity bit generator could be provided elsewhere in the core and the parity bit to be appended would then be provided to the cache 14'.

Meanwhile, the data memory 140 in each cache way also receives the memory address 50. The data memory 140 of the selected cache way is enabled and a corresponding cache line is selected based upon the SET portion 70 of the memory address 50. The data value is provided to a parity bit generator 190 which generates a parity bit based on the value of that data value. The data value and the parity bit generated by the parity bit generator 190 are stored in the cache line.

Once the data value has been written, the valid bit in the TAG entry is set and the dirty bit is cleared.

Figure 4:
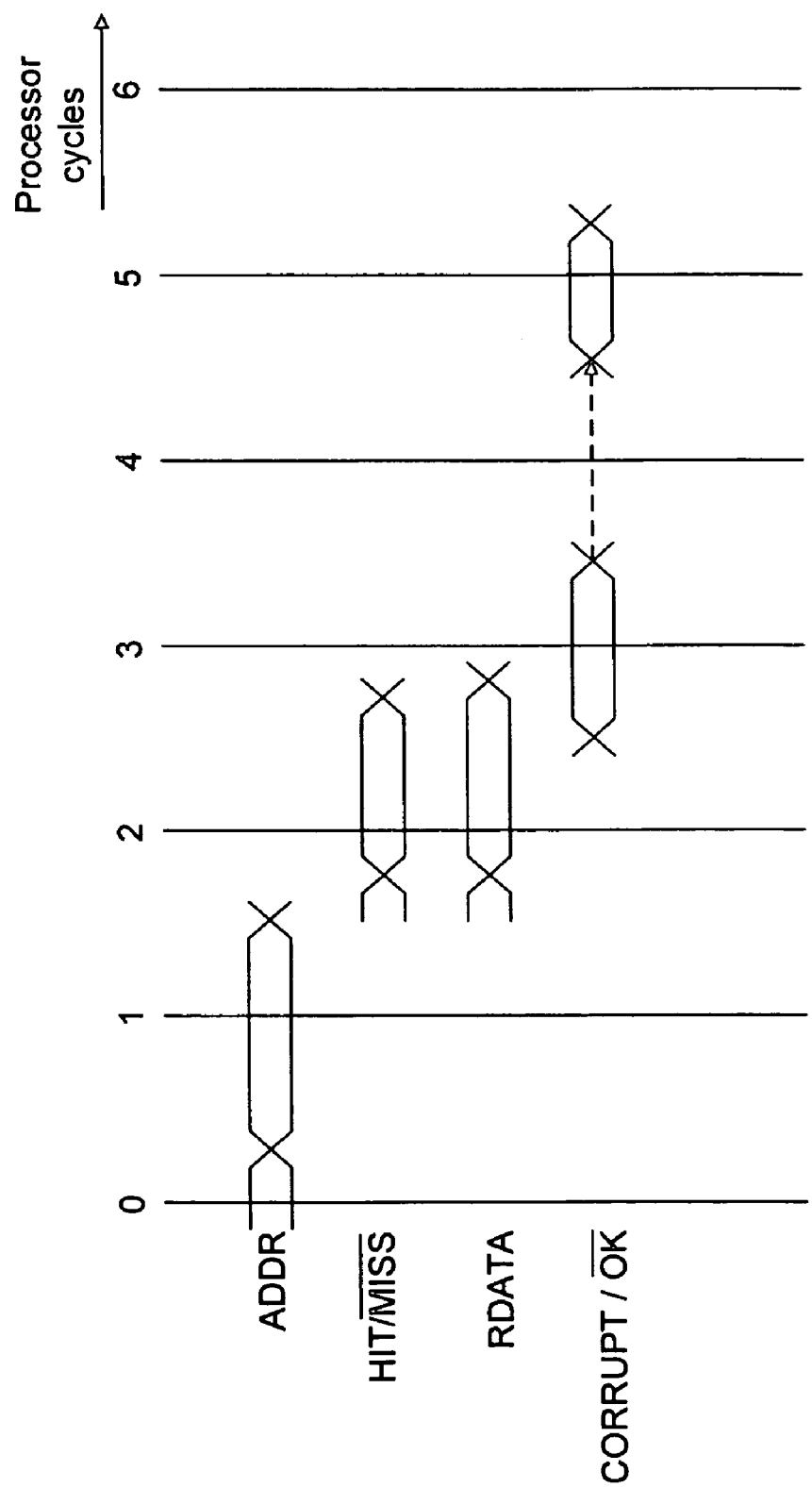
FIG. 4 is a timing diagram showing the operation of the cache of FIG. 3.

As illustrated in FIG. 4, when a read operation is issued by the processor 12, the memory address 50 of the data value to be accessed is placed on a processor address bus 200 in a first processor cycle. The memory address 50 is received by the cache 14' from the processor address bus 200. The TAG memory 130 in each cache way receives the memory address 50. The data memory 140 in each cache way also receives the memory address 50.

In the next processor cycle, the TAG memory 130 outputs the TAG value stored at the location specified by SET portion 70 of the memory address 50 to the associated comparator 210. Each comparator 210 then compares the TAG value output from that cache way with the TAG portion 60 of the memory address 50 placed on the processor address bus 200. Also, the data memory 140 outputs the data value stored at the location specified by the SET portion 70, WORD portion 80 and BYTE portion 90 of the address 50 to the multiplexer 210.

If the TAG value output from any way of the TAG memory 130 and the TAG portion 60 of the address 50 match then during this next processor cycle a corresponding hit signal (e.g. logic '1') is sent to a cache way selector 220. The cache way selector 220 then indicates a cache hit on path 230 to a cache controller (not shown) and outputs a select signal to multiplexer 210. The multiplexer 210 then selects and outputs the corresponding data value onto the processor data bus 240. The processor 12 can then read that data value from the processor data bus 240 and begin processing using the data value output by the cache 14'.

Meanwhile, the TAG value output from each way of the TAG memory 130 is provided to a corresponding parity bit generator 250. The parity bit generator 250 takes the TAG value output from that way of the TAG memory 130 and generates a parity bit. The parity bit generated by the parity bit generator 250 is compared using a comparator 260 with the parity bit output by the TAG memory 130. If the output parity bit and the generated parity bit are not identical (indicating that an error has occurred in the TAG value stored in the TAG memory 130), then the comparator 260 issues a signal over path 265 which indicates that the accessed data value is corrupt. It will be appreciated that if the TAG value has been corrupted then the data value accessed from the data memory 140 is unlikely to be the data value that was intended to be accessed. For clarity, only one parity bit generator 250 and comparator 260 is illustrated. However, it will be appreciated that this arrangement is repeated for each cache way. Alternatively, the TAG values from each cache way could be provided to a selector which receives the select signal from the way selector 220 to select the appropriate TAG value to be provided to just one parity bit generator 250 and comparator 260.

Similarly, the data value output from each way of the data memory 140 is provided to a corresponding parity bit generator 270. The parity bit generator 270 takes the data value output from that way of the data memory 140 and generates a parity bit. The parity bit generated by the parity bit generator 270 is compared using a comparator 280 with the parity bit output by the data memory 140. If the output parity bit and the generated parity bit are not identical (indicating that an error has occurred in the data value stored in the data memory 140), then the comparator 280 issues a corrupt signal over path 285 which indicates that the accessed data value is corrupt. Again, for clarity, only one parity bit generator 270 and comparator 280 is illustrated. However, it will be appreciated that this arrangement is repeated for each cache way. Alternatively, the data values from each cache way could be provided to a selector which receives the select signal from the way selector 220 to select the appropriate data value to be provided to just one parity bit generator 270 and comparator 280.

Paths 265 and 285 are logically combined by OR gate 290 and provide an input to selector 300. The selector 300 receives inputs from the parity bit generator and comparator arrangements for the other cache ways. The selector 300 receives as a control signal the way select signal from the way selector 220. Should a TAG value or a data value accessed for the selected way be corrupt then a corrupt signal indicating that a corruption occurred is provided over path 305.

As illustrated by FIG. 4, the time taken to determine whether the data value is corrupt or not is longer than the time taken to access that data value. In typical situations, the earliest that determination is made is in the processor cycle following the data value (RDATA) being provided on the processor data bus 240. However, the time taken using other logical arrangements or other error detection or correction techniques could be even longer. Hence, it is likely that the processor 12 will have already performed a processing operation using the corrupted data value. Accordingly, as will be explained in more detail below with reference to FIGS. 5A and 5B, the corrupt signal is used to disable the interface between the core and other devices in order to prevent any corrupted data values being distributed further within the data processing apparatus.

If the TAG value and TAG portion 60 do not match then a miss signal (e.g. logic '0') is sent to the cache way selector 220. The cache way selector 220 then indicates a cache miss by supplying an appropriate signal on path 230 and the data value will be read from memory 20 and stored in the cache 14', together with corresponding generated parity bits. Hence, the processor 12 is provided with the data value over the data bus 240 following a delay while it is read from memory 20 and the data value and TAG value are stored in the cache 14' which overwrites a data value and TAG value previously stored in the cache 14'. As explained previously, it would be typical for a linefill of the complete cache line to be performed, where a complete cache line, including the data value indicated by the access request, is read from memory and stored in the cache 14', thereby overwriting a whole cache line previously stored in the cache 14'.

As mentioned above with reference to FIG. 4, typically, time taken to access the TAG value from the TAG memory 130, to generate the parity bit and to compare the generated parity bit to the output parity bit, will be longer than a processor cycle. This is because the time taken by the comparator 210 to perform the comparison of the TAG value with TAG portion 60 of the memory address 50 takes in the order of XOR_delay+($\log_2(2N)$)*AND_delay) (where N is the number of bits being compared), whereas, the time taken by the parity generation logic 250 to generate a parity bit and for that parity bit to be compared with the parity bit read from the TAG memory 130 takes in the order of $\log_2(N)$*XOR_delay. Hence, the corrupt signal will most likely be present on the path 305 in a subsequent processor cycle. Because the corrupt signal occurs in a subsequent cycle, the data value will have been provided to the processor 12 and the processor 12 may already be performing an operation using a corrupted data value.

In order to prevent corrupted data values from propagating throughout the data processing apparatus, the corrupt signal is used to isolate the processor 12 and the cache 14', in the event of one or more corrupted data values being detected, from the rest of the data processing apparatus. Isolating the processor 12 and the cache 14' serves to quarantine the corrupted data values from other devices in the data processing apparatus. This is achieved by effectively disabling the interface or bus 30 between the processor core 10 and the rest of the data processing apparatus.

FIGS. 5A and 5B show two embodiments which enable corrupted data values to be prevented from propagating to other devices in a data processing apparatus.

In FIG. 5A, the data processing apparatus comprises a core 10' having the processor 12, coupled to the cache 14' and to a BIU 16'. The BIU 16' is operable to receive data values for subsequent transmission over the bus 30 to other devices, including one or more safety-critical devices 40. The cache 14' provides the corrupt signal to the BIU 16' over the path 305.

The BIU 16' is operable on receipt of the corrupt signal indicating that a corrupted data value has been accessed from the cache 14' to disable the transmission, over the bus 30, of data values provided to the BIU 16'. By disabling the transmission of data values over the bus 30, corrupted data values can be prevented from being received by any of the safety-critical devices 40.

Figure 6A:
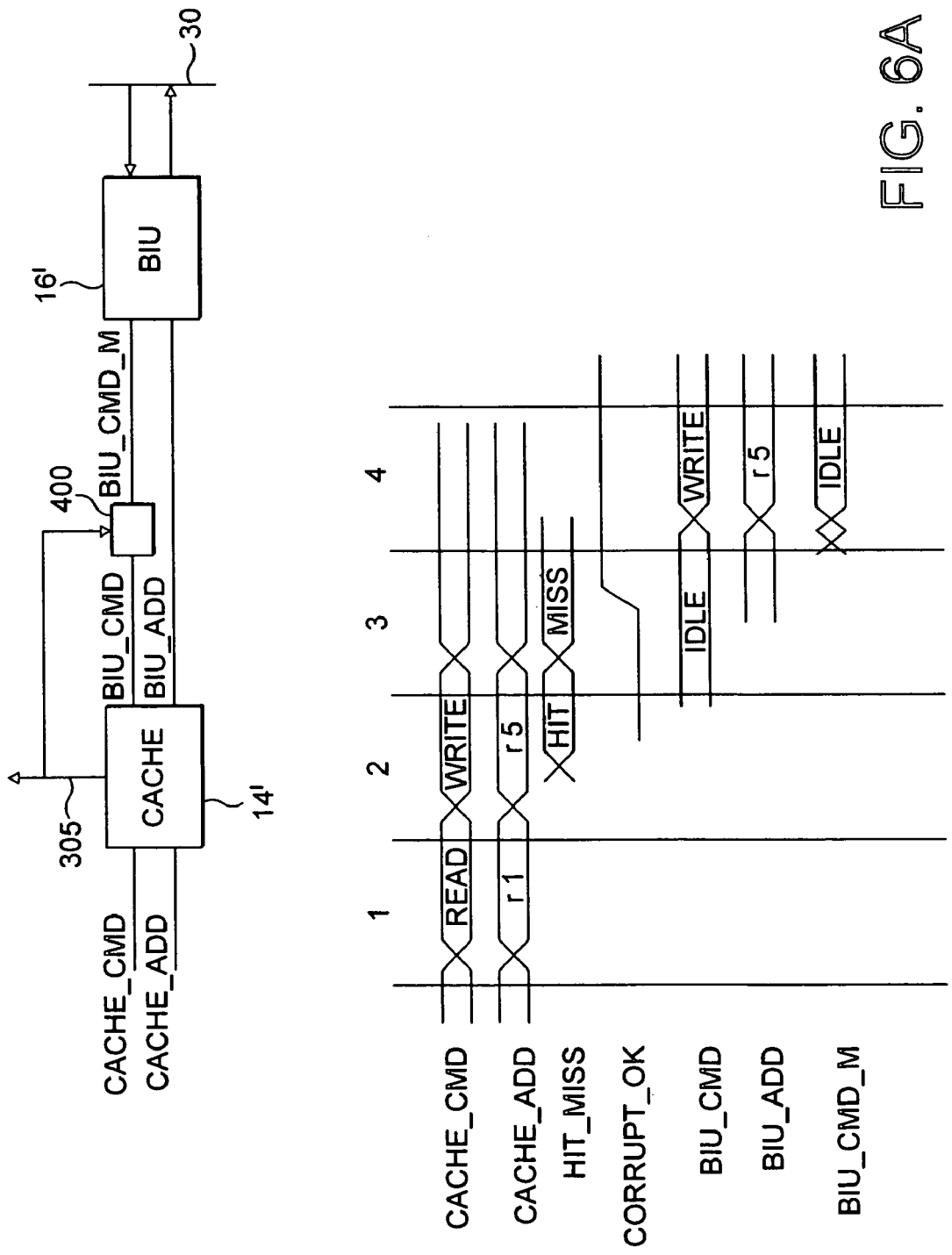
FIGS. 6A and 6B illustrate the operation of the BIU of FIG. 5A.
Figure 6B:
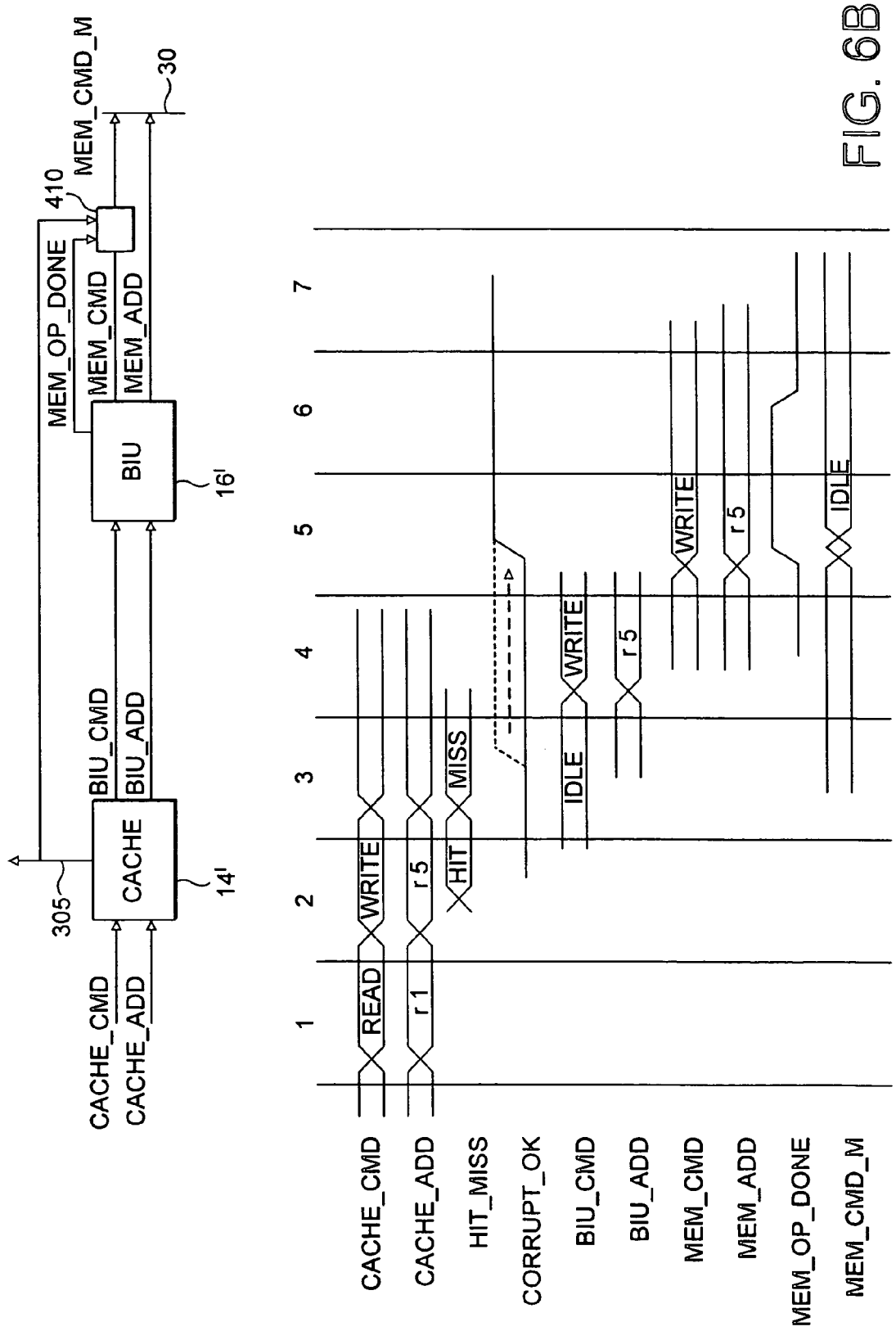

FIGS. 6A and 6B illustrate the operation of the BIU 16', with FIG. 6A showing an arrangement whereby the input to the BIU 16' is conditional on the corrupt signal and with FIG. 6B showing an arrangement whereby the output from the BIU 16' is conditional on the corrupt signal.

In FIG. 6A, conditional logic 400 is provided, which conditions the BIU_CMD signal provided by the cache 14' to the BIU 16', based on the corrupt signal provided over path 305. Whilst the conditional logic 400 is provided separately to the BIU 16', it will be appreciated that this conditional logic 400 may be provided as part of the BIU 16' or as part of the cache 14'.

The conditional logic 400 is operable to provide the BIU_CMD signal as the BIU_CMD_M signal when the corrupt signal indicates that there is no corruption of data values accessed from the cache 14', and to provide an IDLE signal as the BIU_CMD_M signal when the corrupt signal indicates that a corruption has occurred.

To illustrate the operation of FIG. 6A, consider the following example code sequence: LDR r0, [r1]; STR r0 [r5] (i.e. read into the register r0, the data value stored at the address indicated in register r1 and then write the data value stored in the register r0 into the memory address indicated by register r5). It will be appreciated that the LDR and STR instructions are examples of instructions for which processing can be initiated, but which, in themselves, do not cause a resultant data value to be generated. It is assumed that the read of the data value stored at the address indicated in register r1 causes in a cache hit, but results in a parity check error, and that the memory address indicated by register r5 points to a safety-critical peripheral device.

Accordingly, in the first access or processor cycle, in response to the LDR instruction, the CACHE_CMD bus carries a 'read' command and the CACHE_ADD bus carries the address indicated by register r1.

In the second cycle, the cache 14' returns a cache hit signal indicating that a cache hit has occurred and the data value is read from the cache 14' and stored in register r0. Also during the second cycle, in response to the STR instruction, the CACHE_CMD bus carries a 'write' command and the CACHE_ADD bus carries the address indicated by register r5.

In the third cycle, the cache 14' returns a corrupt signal indicating that the data value accessed from the cache 14' is corrupt since it failed its parity check. The issue of the corrupt signal causes the BIU_CMD_M signal to indicate that the BIU 16' should remain in an idle state. Also, during the third cycle, the cache 14' returns a cache miss signal indicating that a cache miss has occurred when attempting to store the contents of the register r0 at the address indicated by register r5 because this address is reserved for the safety-critical peripheral device.

Hence, in the fourth cycle, the BIU_CMD bus carries a 'write' command and the BIU_ADD bus carries the address indicated by register r5. However, the BIU_CMD_M bus fails to transmit the 'write' command since the conditional logic 400 has received a corrupt signal indicating that a data value accessed has been corrupted. Accordingly, the BIU_CMD_M bus carries an 'idle' command which prevents the BIU 16' from receiving the corrupted data value.

Preventing the BIU 16' from receiving the corrupted data value ensures that the safety-critical peripheral device does not receive a corrupted data value and, hence, no change in state in the safety-critical peripheral device can occur due to the corrupted data value. It will be appreciated that by generating the corrupt signal prior to the 'write' command being issued on the BIU_CMD bus ensures that the corrupted data value is not propagated to the BIU 16'. It will also be appreciated that when preventing the BIU 16' from receiving the corrupted data value, the corrupt signal can be generated at any time prior to cycle which causes the corrupted data value from being received by the BIU 16'.

In FIG. 6B, conditional logic 410 is provided, which conditions the MEM_CMD signal provided by the BIU 16' to the bus 30, based on the corrupt signal provided over path 305. Whilst the conditional logic 410 is provided separately to the BIU 16', it will be appreciated that this conditional logic 400 may be provided as part of the BIU 16'.

The conditional logic 410 is operable to provide the MEM_CMD signal as the MEM_CMD_M signal when the corrupt signal indicates that there is no corruption of data values accessed from the cache 14', and to provide an IDLE signal as the MEM_CMD_M signal when the corrupt signal indicates that a corruption has occurred.

To illustrate the operation of FIG. 6B, consider the same code sequence as for FIG. 6A.

In the fifth cycle, because no memory operation is pending (as indicated by the status of the MEM_OP_DONE path), the BIU 16' instructs the MEM_CMD bus to carry a 'write' command, the MEM_ADD bus to carry the address indicated by register r5 and a signal is asserted on the MEM_OP_DONE path to indicate that a memory operation is now pending. It will be appreciated that the signal provided over MEM_OP_DONE path indicating that a memory operation or access is pending may be many cycles in duration since accesses over the bus 30 are comparatively much slower than between the processor 12, cache 14' and the BIU 16'. If a memory operation was pending then the BIU 16' would wait until that operation had completed before asserting the signals indicated above.

However, on the transition of the signal provided on the MEM_OP_DONE path, the MEM_CMD_M bus fails to transmit the 'write' command since the conditional logic 410 has received a corrupt signal indicating that a data value accessed has been corrupted. By checking whether the corrupt signal on a transition of the signal provided over the MEM_OP_DONE path helps to prevent the bus 30 from being inhibited whilst an memory operation or access is being undertaken. Whilst, it may be possible to inhibit the bus 30 whilst an access is pending, it is likely that the inhibit will result in the bus 30 hanging, which is undesirable.

It will be appreciated that providing conditional logic 410 on the output of the BIU 16' further extends the time period by which the corrupt signal needs to be generated. In this example, the corrupt signal can be generated as late as the beginning of the fifth cycle following the initial access of the data value which was corrupted. More generally, it will be appreciated that when preventing the BIU 16' from outputting the corrupted data value, the corrupt signal can be generated at any time prior to cycle which causes the corrupted data value to be transmitted by the BIU 16'.

Preventing the BIU 16' from transmitting the corrupted data value ensures that the safety-critical peripheral device does not receive a corrupted data value and, hence, no change in state in the safety-critical peripheral device can occur due to the corrupted data value. It will be appreciated that by generating the corrupt signal prior to the 'write' command being issued on the MEM_CMD bus ensures that the corrupted data value is not propagated to the safety-critical peripheral device.

Figure 7:
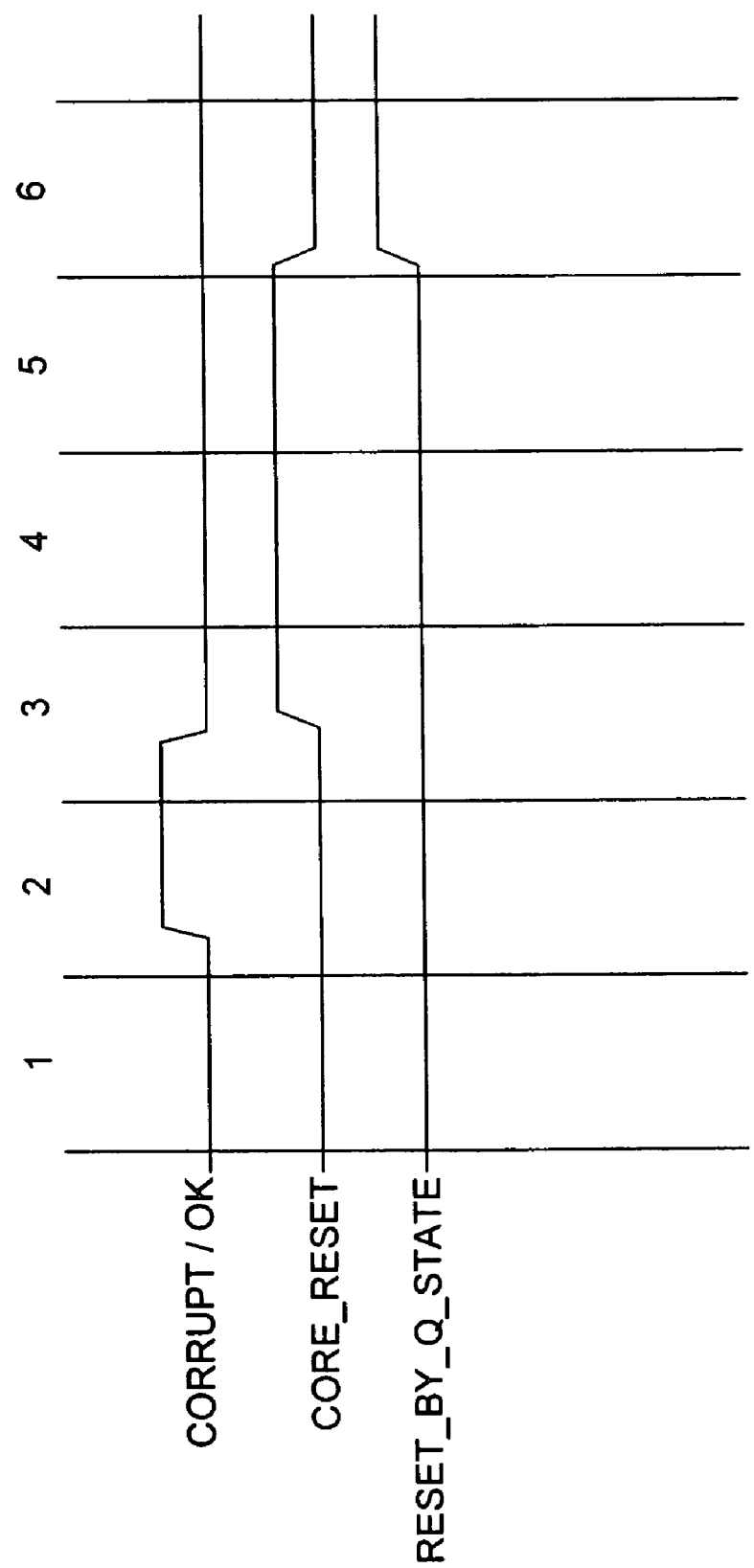
FIG. 7 illustrates the operation of a system reset controller.

The corrupt signal is also received by a system reset controller 310 over the path 305. On receipt of the corrupt signal indicating that a corrupted data value has been accessed from the cache 14', the system reset controller 310 causes the core 10' to reinitialise as illustrated in FIG. 7. Whilst, in this example, only the core 10' is reinitialised, it will be appreciated that the system reset controller 310 could be arranged to reset the whole data processing apparatus or part thereof.

The system reset controller 310 has a status register (RESET_BY_QSTATE) which can be read by the processor 12. Upon receipt of the corrupt signal over path 305, the system reset controller 310 asserts a CORE_RESET signal in the next cycle for a number of cycles (in this example 3 cycles) and then sets the status register. The processor 12 will respond to the CORE_RESET signal and initiate a reset process. After the sixth cycle, the processor 12 will exit the reset process and fetch instructions from a reset vector. In this example, the instructions fetched from the reset vector then cause the processor 12 to read the status register which enables the processor to determine whether or not the reset was caused by a parity error.

In FIG. 5B, the data processing apparatus comprises a core 10" having the processor 12, coupled to the cache 14' and to a BIU 16. The BIU 16 is operable to receive data values for subsequent transmission over the bus 30 to other devices, including one or more safety-critical devices 40'. The cache 14' provides the corrupt signal to each safety-critical device 40' over the path 305.

Each safety-critical device 40' is operable on receipt of the corrupt signal indicating that a corrupted data value has been accessed from the cache 14' to disable its interface which is used to receive data values provided by the BIU 16 over the bus 30. It will be appreciated that a similar technique to that described with reference to FIGS. 6A and 6B could be employed with the safety-critical device 40'. By disabling its interface, each safety-critical device 40' can be prevented from receiving corrupted data values over the bus 30.

As with the previous arrangement, the corrupt signal is also received by a system reset controller 310 over the path 305. On receipt of the corrupt signal indicating that a corrupted data value has been accessed from the cache 14, the system reset controller 310 causes the core 10' to reinitialise.

Hence, in either embodiment, a data value can be accessed from the cache 14'. That accessed data value can be processed in a normal manner by the processor 12. In parallel with the processing taking place, a determination can be made by logic within the cache 14' as to whether the accessed data value is corrupt or not, thereby not affecting the critical path or reducing the normal operating speed of the processor 12. Once that determination has been made, the interface between the core and any safety-critical devices can be isolated. Isolating the interface prevents any corrupted data values from being propagated to the safety-critical devices and prevents any change in state in those safety-critical devices occurring as a result of corrupted data values.

Figure 8:
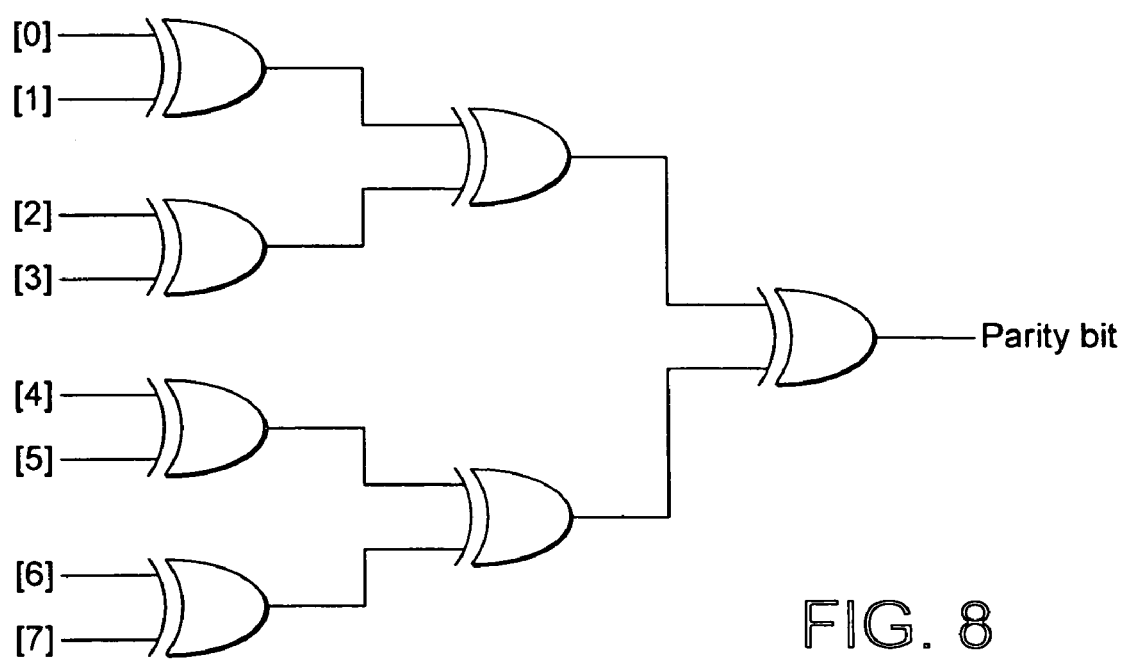
FIG. 8 illustrates the logical arrangement of an example parity bit generator.

FIG. 8 illustrates the arrangement of logic used in a parity bit generator such as generators 180, 190, 250, 270. To generate the parity bit, the bits of the desired data (e.g. a TAG value, a byte, a word, a cache line) for which a parity bit is to be generated are XORed together. In this example, the data comprises 8 bits, but it will be appreciated that the parity bit for more than 8 bits can be generated by providing more XOR gate stages. Consecutive bits of the desired data are provided to the inputs of two-input XOR gates. The output of these XOR gates are in turn provided to inputs of two-input XOR gates, and so on until they have been combined to a single output from a single XOR gate, which gives the parity bit.

Whilst this embodiment has been described using a parity bit technique for detecting corrupted data values, it will be appreciated that other error detection techniques could be employed.

Whilst the above embodiments have described error detection techniques being applied to the TAG value and the data value, it will be appreciated that these techniques need not be applied to both the TAG value and the data value but could instead be simply applied to one or the other.

Whilst the above embodiments envisages utilising the corrupt signal to prevent the BIU from transmitting data values or the safety-critical devices from receiving data values, it will be appreciated that the BIU could be arranged to prevent transmission of data values together with the safety-critical devices being arranged to not receive data values.

Whilst the above embodiments describe resetting the core using a system reset controller once a corrupted data value has been detected, it will be appreciated that instead, the corrupt signal could be passed to the processor 12 and held until it is recognized by the processor 12. Once detected, the processor 12 would activate a handler routine. The handler routine then seeks to correct any corruption that has occurred. Clearly where error correction information is stored in preference to error detection information such as a parity check, the likelihood of correcting any corruption using the handler routine is increased. In the event that the corruption can not be readily corrected, the handler routine can then cause the core to be reset.

From the above description, it will be appreciated that embodiments of the present invention provide improved technique for handling corrupted data values which can retain the performance of the processor core during normal operation whilst ensuring corrupted data values do not cause a change in the state of a peripheral device.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. A method of handling corrupted data values, the method comprising the steps of:
   a) accessing a data value in a memory within a data processing apparatus;
   b) initiating processing of the data value within the data processing apparatus;
   c) whilst at least one of the steps a) and b) are being performed, determining whether the data value accessed is corrupted; and
   d) when it is determined that the data value is corrupted, disabling an interface used to propagate data values between the data processing apparatus and a device coupled to the data processing apparatus to prevent propagation of a corrupted data value to the device.

2. The method of claim 1, wherein step d) comprises the step of preventing the corrupted data value from being transmitted to the device coupled to the data processing apparatus.

3. The method of claim 2, wherein the data processing apparatus comprises an interface unit operable to transmit data values between the data processing apparatus and the device, and step d) comprises the step of inhibiting the operation of the interface unit to prevent the corrupted data value being transmitted to the device.

4. The method of claim 1, wherein step d) comprises the step of preventing the device coupled to the data processing apparatus from receiving the corrupted data value.

5. The method of claim 4, wherein the device comprises interface logic operable to receive data values from the data processing apparatus, and step c) comprises the step of inhibiting the operation of the interface logic to prevent the corrupted data value being received by the device.

6. The method of claim 1, wherein the corrupted data value comprises the accessed data value.

7. The method of claim 1, wherein step b) comprises initiating processing of the data value within the data processing apparatus in order to generate at least one resultant data value and the corrupted data value comprises the at least one resultant data value.

8. The method of claim 1, wherein step a) comprises the step of accessing the data value in the memory in a first processor cycle, and step b) comprises the step of initiating processing of the data value in a processor cycle subsequent to the first processor cycle.

9. The method of claim 1, wherein the completion of the determination in step c) takes place in a processor cycle subsequent to the first processor cycle.

10. The method of claim 1, further comprising the step of:
e) reinitialising the data processing apparatus following a determination at step c) that the data value accessed is corrupted.

11. The method of claim 10, further comprising the step of:
f) enabling the interface following reinitialisation of the data processing apparatus.

12. The method of claim 1, wherein the device is coupled to the data processing apparatus via a bus.

13. The method of claim 1, wherein the device is a safety-critical device.

14. A data processing apparatus for handling corrupted data values, comprising:
a memory from which a data value can be accessed;
a processor operable to initiate processing of the data value;
corruption logic operable, whilst at least one of the data value being accessed and the data value being processed is occurring, to determine whether the data value accessed is corrupted and, when it is determined that the data value is corrupted, to generate a corruption signal to disable an interface used to propagate data values between the data processing apparatus and a device coupled to the data processing apparatus to prevent propagation of a corrupted data value to the device.

15. The apparatus of claim 14, wherein the corruption logic is operable to prevent the corrupted data value from being transmitted to the device.

16. The apparatus of claim 15, wherein the data processing apparatus comprises an interface unit operable to transmit data values between the data processing apparatus and the device and the corruption signal causes the operation of the interface unit to be inhibited to prevent the corrupted data value being transmitted to the device.

17. The apparatus of claim 14, wherein the corruption logic is operable to prevent the device coupled to the data processing apparatus from receiving the corrupted data value.

18. The apparatus of claim 17, wherein the data processing apparatus comprises the device, the device comprises interface logic operable to receive data values from the data processing apparatus and the corruption signal causes the operation of the interface logic to be inhibited to prevent the corrupted data value being received by the device.

19. The apparatus of claim 14, wherein the corrupted data value comprises the accessed data value.

20. The apparatus of claim 14, wherein the processor is operable to initiate processing of the data value in order to generate at least one resultant data value and the corrupted data value comprises the at least one resultant data value.

21. The apparatus of claim 14, wherein the data value is accessed in the memory in a first processor cycle, and processing of the data value is initiated in a processor cycle subsequent to the first processor cycle.

22. The apparatus of claim 14, wherein the corruption logic is operable to complete the determination of whether the data value accessed is corrupted in a processor cycle subsequent to the first processor cycle.

23. The apparatus of claim 14, further comprising:
reinitialisation logic operable in response to the corruption signal to reinitialise the data processing apparatus.

24. The apparatus of claim 23, wherein the reinitialisation logic is operable to enable the interface following reinitialisation of the data processing apparatus.

25. The apparatus of claim 14, wherein the device is coupled to the data processing apparatus via a bus.

26. The apparatus of claim 14, wherein the device is a safety-critical device.

* * * * *